Dec. 17, 1940.  W. D. OSBORN  2,225,129
SEWER CLEANING TOOL POWER PLANT
Filed May 22, 1939  3 Sheets-Sheet 1
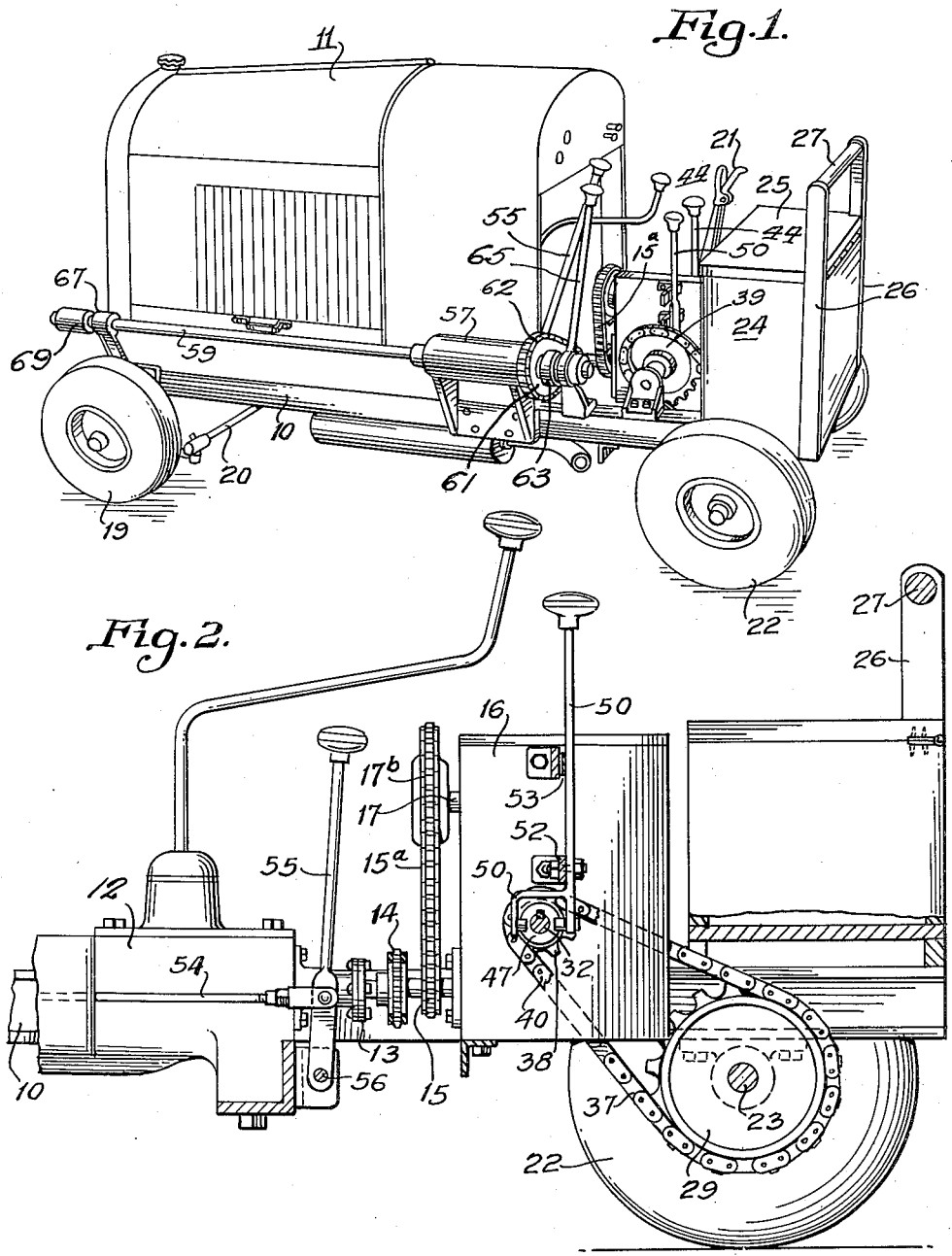
INVENTOR.
WILLIAM D. OSBORN
BY
ATTORNEY.

Dec. 17, 1940.  W. D. OSBORN  2,225,129
SEWER CLEANING TOOL POWER PLANT
Filed May 22, 1939  3 Sheets-Sheet 2

INVENTOR.
WILLIAM D. OSBORN
BY
ATTORNEY.

Dec. 17, 1940.  W. D. OSBORN  2,225,129
SEWER CLEANING TOOL POWER PLANT
Filed May 22, 1939  3 Sheets-Sheet 3

INVENTOR.
WILLIAM D. OSBORN
BY
ATTORNEY.

Patented Dec. 17, 1940

2,225,129

UNITED STATES PATENT OFFICE 2,225,129

SEWER CLEANING TOOL POWER PLANT

William D. Osborn, Los Angeles, Calif.

Application May 22, 1939, Serial No. 275,126

9 Claims. (Cl. 180—53)

My invention relates to a prime mover or power plant, particularly designed for driving the rods and tools utilized in removing accumulations from sewers, pipe lines, and the like, and especially those lines or ducts that are located beneath the ground and, the principal objects of my invention are, to generally improve upon and simplify the construction of the existing forms of power driven motors now generally used for operating sewer and pipe line cleaning tools and the rods connected thereto and, to provide a prime mover or motor powered driving means of the character referred to that is relatively simple in construction, inexpensive of manufacture, and which is mounted on traction wheels in order that it may be conveniently moved forwardly or backwardly in the performance of its functions.

There are various forms and types of tools utilized for removing accumulations from sewers, pipe lines, and the like, some of which tools are pulled or pushed through the sewer or pipe line and others being rotated simultaneously with their travel through the sewer or pipe line. Practically all cleaning out tools are operated by flexible rods that extend through the sewers or pipe lines and, it is one of the principal objects of my invention to provide simple and efficient means for imparting either longitudinal or rotary movement to these rods and to the cleaning out tools to which the rods are connected.

Further objects of my invention are, to provide mobile motor powered driving means having controllable means for rotating the rod and the tool to which said rod is connected, at varying speeds above or below the speed of the main driving shaft of the power plant in order that the tools may be driven so as to function at highest efficiency in performing the cleaning out operations, further, to provide controllable means for moving the motor powered driving means forwardly or backwardly at varying speeds and the operation of the rod rotating means being entirely independent of said motor powered driving means.

A further object of my invention is, to provide improved means for detachably connecting the flexible rod to the driving shaft therefor and which connecting means may be readily manipulated so as to effect a coupling or uncoupling of the flexible rod and, said connection including a universal joint that enables the tool driving rod to be effectively operated even though said rod is not in alignment with the rod driving shaft.

With the foregoing and other objects in view, my invention consists in certain novel features of construction and arrangement of parts that will be hereinafter more fully described and claimed and illustrated in the accompanying drawings in which:

Fig. 1 is a perspective view of a mobile power plant constructed in accordance with my invention.

Fig. 2 is an enlarged side elevational view of the rear portion of the motor powered driving means with parts thereof in vertical section.

Figure 3:
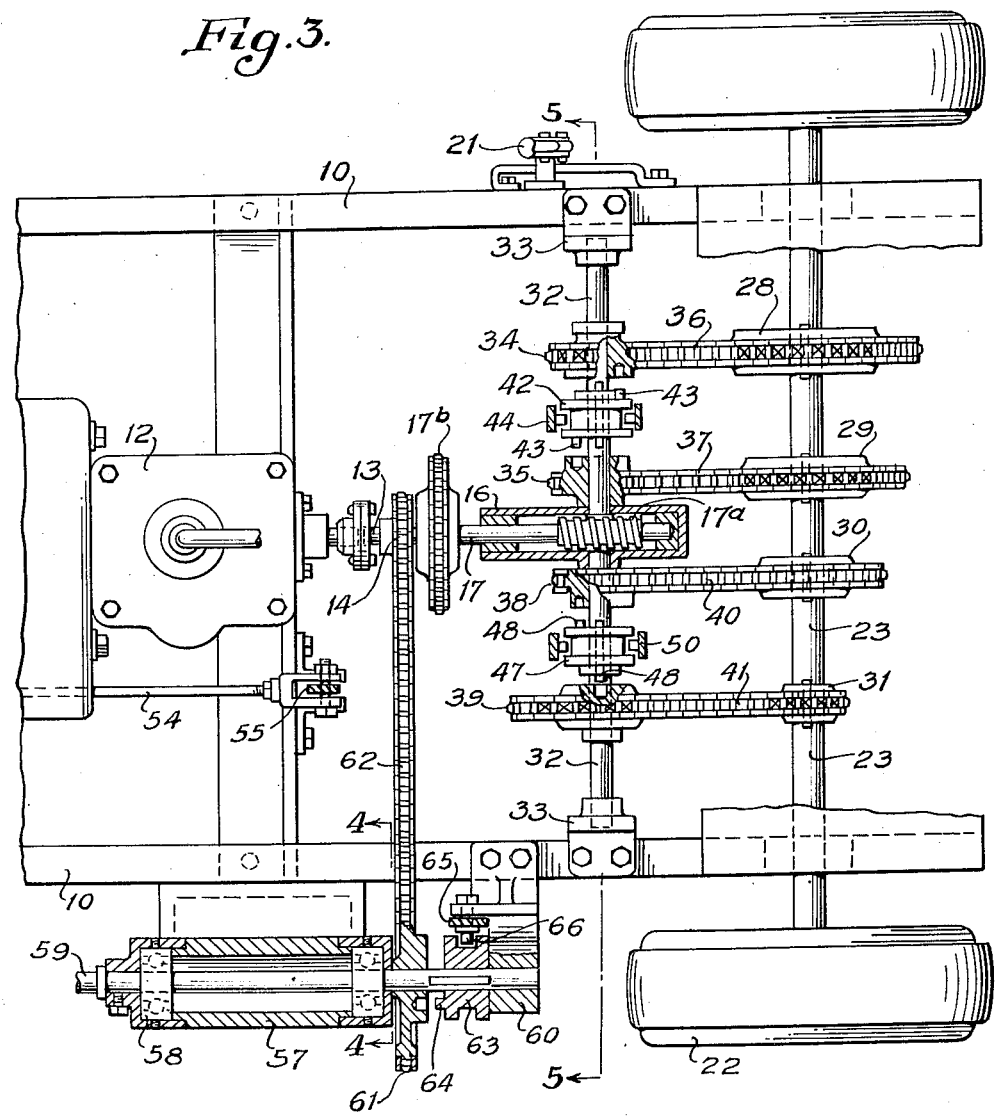
Fig. 3 is a top plan view of the rear portion of the frame of the motor with parts thereof in section and showing the detail of the drive between the engine shaft and the rear axle and the flexible rod transmission drive.
Figure 4:
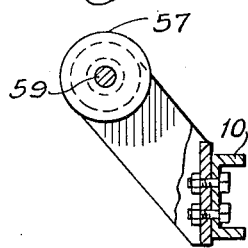
Fig. 4 is a detail section taken on the line 4—4 of Fig. 3.
Figure 5:
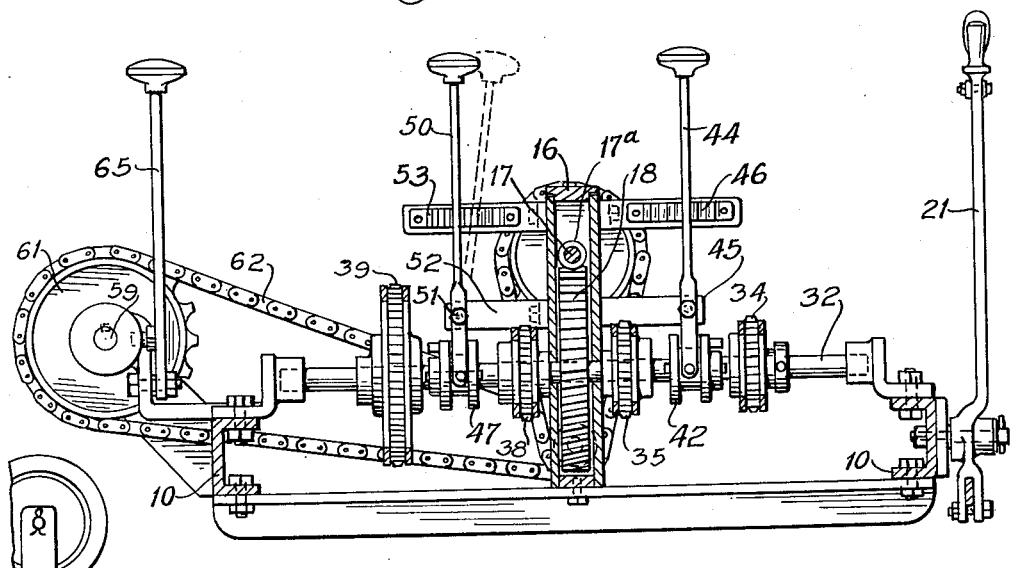
Fig. 5 is a cross section taken on the line 5—5 of Fig. 3.

Referring by numerals to the accompanying drawings which illustrate a preferred embodiment of my invention, 10 designates a frame, preferably composed of metal bars, and mounted on the forward portion of said frame is a housing 11 that contains a conventional internal combustion engine (not shown) and, associated with the projecting rear end of the motor shaft is a housing 12 that encloses a conventional transmission. Connected to the end of the driving shaft that projects from the transmission housing is a shaft 13 on which are fixed small sprocket wheels 14 and 15.

Journalled in the upper portion of a narrow gear box 16 that is mounted on the truck frame 10 is a shaft 17 and, fixed on said shaft within the gear box is a worm 17a that engages the teeth of a worm wheel 18, the latter being located in the lower portion of the gear box. Mounted on the outer end of shaft 17 is a sprocket wheel 17b and, connecting the same with sprocket wheel 15 is a sprocket chain 15a.

The forward end of the motor frame 10 is supported by front wheels 19 that are actuated by steering gear 20 similar to the steering gear associated with motor vehicles and, such steering gear being under manual control of a lever 21 that is mounted on the right hand side of the rear portion of the motor frame.

The rear portion of the motor frame is supported by driving wheels 22 that are mounted on the ends of a driving axle 23, the latter being journalled in suitable bearings on the under side of the rear portion of the motor frame.

Supported on top of the rear portion of the motor frame is a box-like structure 24 having a hinged cover 25 and, said box and cover provide a seat for the operator of the motor. Box 24 provides a receptacle and storage place for tools and accessories used in the operation of the power plant and the tools that are driven thereby.

Projecting upwardly from the rear corners of the box 24 are standards 26 and connecting the upper ends thereof is a transverse rod 27, which latter functions as a back rest for the driver of the motor and also as a handle whereby the rear portion of the motor may be lifted and shifted laterally in either direction while being positioned for use. Likewise, the handle 27 may be grasped when the motor is moved forwardly or backwardly before the engine is started.

Fixed on axle 23 is a plurality of sprocket wheels, preferably four in number, and graduated in size. The numeral 28 designates the largest sprocket wheel, 29 the next smaller sprocket wheel, 30 the next smaller sprocket wheel, and 31 the smallest sprocket wheel. A shaft 32 on which the worm wheel 18 is fixed is journalled in suitable bearings 33 on the side rails of the motor truck frame 10 and, journalled on this shaft in alignment with the sprocket wheels 28 and 29 are sprocket wheels 34 and 35 respectively. A sprocket chain 36 connects the sprocket wheel 28 and 34 and a sprocket chain 37 connects the sprocket wheels 29 and 35. Journalled on shaft 32 on the opposite side of housing 16 from the sprocket wheels 34 and 35 is a small sprocket wheel 38 that is in line with sprocket wheel 30 and a larger sprocket wheel 39 is journalled on the shaft 32 in line with the small sprocket wheel 31 on axle 23. Connecting the sprocket wheels 30 and 38 is a sprocket chain 40 and a sprocket chain 41 connects sprocket wheels 31 and 39.

Mounted to rotate with and slide longitudinally on shaft 32 between the sprocket wheels 34 and 35 is a grooved collar 42 provided on its ends with pins or clutch faces 43 that are adapted to engage respectively with corresponding clutch faces on the sprocket wheels 34 and 35. The bifurcated lower end of a lever 44, the latter being pivoted on a bracket 45 that extends outwardly from the side of housing 16, engages the groove in the collar 42 and, by swinging lever 44 on its pivot the clutch faces on the end of the collar 42 may be engaged with the clutch faces on the sprocket wheels 34 and 35, so as to effect driving engagement between shaft 32 on which the collar is mounted to rotate with either sprocket wheel 34 or 35.

Projecting from the upper portion of housing 16 is a ratchet plate 46 with which the lever 44 is adapted to engage so that said lever is held in an intermediate position or with the collar 42 engaged with either one of the sprocket wheels 34 and 35.

Mounted to rotate with and slide longitudinally upon shaft 32 between the sprocket wheels 38 and 39 is a grooved collar 47 provided on its ends with pins or clutch faces 48 that are adapted to engage corresponding clutch faces on the sprocket wheels 38 and 39.

The bifurcated lower end of an upright lever 50 fulcrumed at 51 on a bracket 52 that projects from housing 16, engages the groove in collar 47 so as to shift said collar lengthwise upon the shaft 32 when the lever is swung upon its fulcrum. The parts just described provide means for effecting driving engagement between shaft 32 and either one of the sprocket wheels 38 and 39.

Projecting from the upper portion of the housing 16 is a ratchet plate 53 that is adapted to engage and hold in its adjusted position the lever 50 that actuates collar 47.

The clutch of the motor is actuated by a reciprocating rod 54 that is moved lengthwise by means of an upright lever 55, the lower end of which is fulcrumed at 56 to a bracket that projects from a cross rail of the motor truck frame.

Mounted on the left hand side of the truck frame 10 is a horizontally disposed cylinder 57 provided at its ends with anti-friction bearings 58 and, journalled in said bearings is a shaft 59 that parallels the adjacent side rail of the truck frame and said shaft passes entirely through cylinder 57. The chamber within this cylinder is adapted to contain a lubricant, preferably grease.

The end of the shaft 59 that projects through the cylinder 57 is provided with a bearing 60 that projects from the adjacent side rail of the truck frame. Journalled on shaft 59 adjacent the end of cylinder 57 is a sprocket wheel 61 in alignment with sprocket wheel 14 on shaft 13 and, connecting these sprocket wheels 14 and 61 is a sprocket chain 62. Mounted to rotate with and slide longitudinally upon shaft 59 adjacent sprocket wheel 61 is a grooved collar 63 and, the end thereof adjacent the sprocket wheel 61 is provided with pins 64 or a clutch face that is adapted to engage a corresponding clutch face on sprocket wheel 61. The lower end of a lever 65 is fulcrumed on bracket 60, and, projecting from said lever above its fulcrum into the groove in the collar 63 is a pin 66.

The construction just described provides means whereby sprocket wheel 61 may be locked for rotation on shaft 59 and thus, said shaft is driven from shaft 13 by means of the sprocket wheel 14 and sprocket chain 62.

Shaft 59 may be properly termed the rod driving shaft inasmuch as it imparts rotary motion to the flexible rod or rods that pass into and through the sewer or other duct that is being cleaned and, this rod driving shaft extends forwardly alongside the hood or housing 11 and its forward portion is journalled in a bearing 67 that projects from the left hand side of the truck frame.

Figure 6:
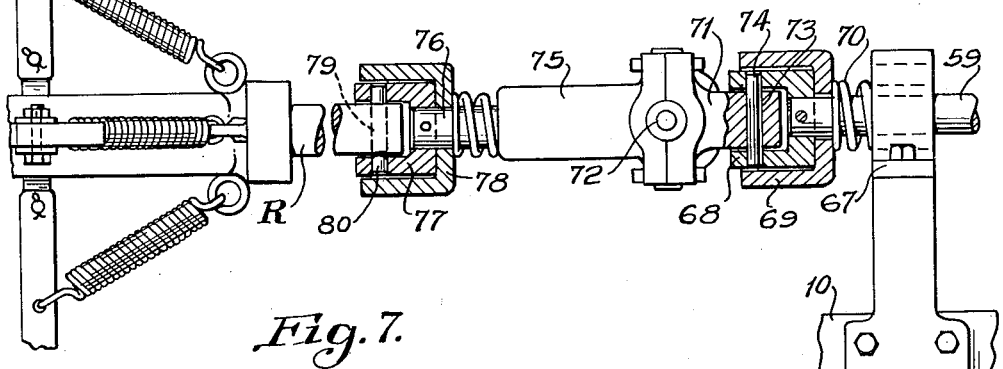
Fig. 6 is an elevational view of the coupling and universal joint for the flexible rod that is utilized in driving the cleaning out tool.

A coupling and universal joint utilized between the rod driving shaft 59 and the flexible rod is illustrated in Fig. 6 and comprises a socket 68 that is suitably secured to the end of said shaft 59. Normally enclosing the socket 68 is a cup-shaped housing 69 and, interposed between said housing and the bearing 67 is an expansive coil spring 70 that normally maintains the housing 69 in position so that it practically encloses the socket 68.

A stem 71 projects from one part of a conventional universal joint 72 and, formed diametrically through said stem is an aperture 73 for the reception of a pin 74 and which latter also passes through apertures formed in the wall of socket 68. Thus one end of the universal joint is detachably connected to socket 68 and, when the parts are connected the housing 69 overlies the ends of pin 74, thereby preventing the same from dropping out of the apertures in the socket and the stem 71.

Projecting from the member 75 which together with member 71 provides a universal joint is a stem 76 to which is suitably secured a socket 77 similar to socket 68 and, adapted to normally enclose said socket is a spring pressed housing 78 similar to housing 69. The flexible rod R that is attached to the cleaning tool or implement that is pushed or drawn through the sewer or other line that is being cleaned is provided in its end with a diametrically disposed aperture 79 that is adapted to receive a pin 80, the ends of which latter are seated in apertures in the socket 77 and, under normal conditions when the parts are connected the spring-held housing 78 overlies the ends of the pin 80 so as to prevent the same from becoming detached from the socket and the end of the flexible rod.

To disconnect the rod R from the socket 77, the housing 78 is moved rearwardly against the yielding resistance of its spring until the pin 80 is exposed and, under such conditions said pin is free to be readily removed from the socket and the rod, thereby releasing the latter. Likewise, the member 71 of the universal joint can be readily detached from socket 68 by moving housing 69 away from said socket so as to permit pin 74 to be withdrawn from the socket and member 71.

The universal joint 72 is utilized only when the sewer or other duct that is being cleaned is out of longitudinal alignment with the rod driving shaft 59 and, where the sewer and said rod driving shaft are in longitudinal alignment with each other, the end of the rod R may be connected directly to the socket 68 that is carried by shaft 59.

To operate the motor, lever 55 is manipulated to throw in the clutch associated with the engine and driving shaft and thus, rotary motion of the engine shaft is transmitted through the transmission gearing contained in housing 12 and, under control of the conventional gear shift lever is transmitted to shaft 13. Rotary motion is transmitted from shaft 13 by means of sprocket wheels 15, 17b, and sprocket chain 15a, to shaft 17 and, the rotary motion of the latter is imparted through worm 17a and worm wheel 18 to shaft 32 on which said worm wheel is mounted.

After the flexible rod R has been connected to the universal joint or to the socket 68 of the rod driving shaft 59, the motor may be driven forwardly to push the flexible rod through the sewer or duct that is to be cleaned or in the opposite direction so as to draw the rod and the cleaning tool or appliance connected thereto through the sewer or other duct. To impart rotary motion to the flexible rod and the cleaning tool or appliance connected thereto, the operator seated on the box 24 manipulates lever 65 so as to cause the clutch face of collar 63 to engage the clutch face on sprocket wheel 61 and thus, rotary motion will be imparted to said shaft 59 from shaft 13 through sprocket wheels 14, 61, and sprocket chain 62. Obviously, the speed imparted to the rod driving shaft 59 may be regulated by manipulation of the gear shift lever that controls the transmission gearing between the engine shaft and shaft 13.

The truck may be driven forwardly or rearwardly at varying speeds as a result of manipulation of the levers 44 and 50 and, during such forward and rearward travel the truck is guided by proper manipulation of the steering lever 21 that controls the steering gear associated with the front wheels 19. Manipulation of lever 44 shifts collar 42 so as to effect driving engagement between said collar that is fixed on shaft 32 and sprocket wheel 34 or 35. Likewise, manipulation of lever 50 will shift collar 47 which is carried by shaft 32 into driving engagement with either sprocket wheel 38 or 39.

Figure 7:
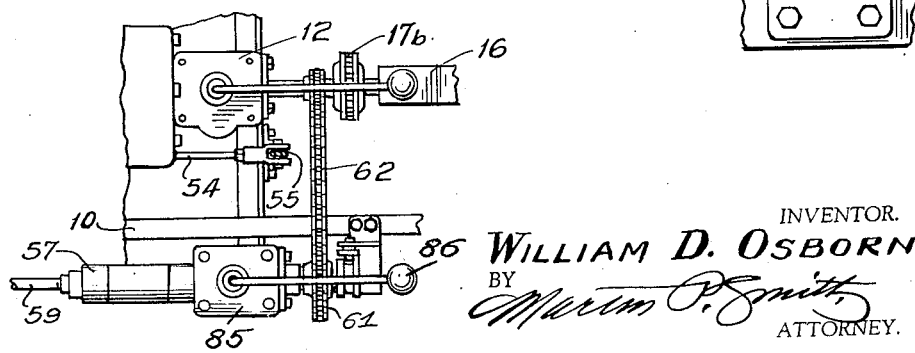
Fig. 7 is a plan view of a modified form of the driving connections, including the transmissions between the motor shaft and the rod driving means.

In Fig. 7, I have shown a variable speed transmission arrangement for driving the rod driving shaft 59 wherein a conventional transmission gearing located in a gear box or housing 85 and controlled by a hand lever 86, provides a connection between the shaft that carries sprocket wheel 61 and the rod driving shaft 59 and enables shaft 59 to be driven at varying speeds throughout a wide range.

This variable speed transmission for the shaft 59 is especially desirable and advantageous in apparatus of the character to which my invention relates by reason of the fact that, the tool that is connected to shaft 59 may be driven at various selective speeds while the wheeled frame carrying the motor is being moved forwardly or backwardly at selective speeds.

Inasmuch as the sprocket wheels 34, 35, 38 and 39 are connected respectively to the sprocket wheels 28, 29, 30 and 31 by the sprocket chains 36, 37, 40 and 41, the rotary motion of shaft 32 will be transmitted to wheel-carrying axle 23 and, as the sprocket wheels 28, 29, 30 and 31 have different diameters, said wheel-carrying axle 23 may be driven at various speeds and such variance of speed is further increased by reason of the fact that the conventional transmission gearings used in connection with motor vehicles generally have three forward speeds and one reverse speed. Thus the motor is capable of being driven forwardly at twelve different speeds and where the transmission has three forward speeds the flexible rod driving shaft 59 may be operated at three different speeds.

Further, the use of selective speed gearing for driving shaft 59 as illustrated in Fig. 7 materially increases the efficiency and scope of usefulness of the machine in performing its intended functions.

Such provision is of especial advantage in apparatus of the character to which my invention relates, for the motor may be driven at very low speed forwardly or backwardly and the flexible rod driving shaft 59 operated at a high speed or, under different conditions the rod driving shaft may be rotated at slow speed and the truck moved forwardly or backwardly as the case may be, at low, intermediate, or high speed.

Thus where clogging accumulations in a sewer or duct are comparatively hard, the truck may be operated so as to travel very slowly and the flexible rod driving shaft rotated at high speed, thus accomplishing the cleaning out operations within a comparatively short period of time.

Where the accumulations are soft, the truck may be caused to travel with considerable speed away from the sewer or conduit that is being cleaned and the rod driving shaft operated at slow or intermediate speed to effectively accomplish the cleaning out operation.

Thus it will be seen that I have provided a sewer cleaning tool power plant that is relatively simple in construction, inexpensive of manufacture, and very effective in performing the functions for which it is intended.

It will be understood that minor changes in the size, form and construction of the various parts of my improved sewer cleaning tool power plant, may be made and substituted for those herein shown and described, without departing from the spirit of my invention, the scope of which is set forth in the appended claims.

I claim as my invention:

1. In a power plant for operating sewer cleaning tools and the like, a truck frame, steering wheels supporting the front of said frame, an axle journalled in the rear portion of said frame, traction wheels carried by the ends of said axle, a motor mounted on the front portion of the truck frame, a transmission and a driving shaft, a shaft journalled on the truck frame in front of the rear axle, driving connections between the driving shaft and said last mentioned shaft, a plurality of sprocket wheels of different sizes mounted on the rear axle, pairs of sprocket wheels mounted on the shaft that is positioned in front of said rear axle, sprocket chains connecting the sprocket wheels on said shaft with the sprocket wheels on the rear axle, manually operable clutches mounted on said shaft between the members of each pair of sprocket wheels thereon for selectively effecting driving engagement between said shaft and either one of the members of either pair of sprocket wheels that are mounted on said shaft, a flexible rod driving shaft journalled on the side of the truck frame and driving connections between said first driving shaft and said rod driving shaft.

2. A power plant for operating sewer cleaning tools and the like as set forth in claim 1, with manually operable means for controlling the operation of said rod driving shaft.

3. A power plant for operating sewer cleaning tools and the like as set forth in claim 1, with an operator's seat mounted on the rear portion of the truck frame above the rear axle.

4. A power plant for operating sewer cleaning tools and the like as set forth in claim 1, with an operator's seat mounted on the truck frame above the rear axle, a back projecting upwardly from the rear portion of said seat and a transverse rod forming a part of said back and adapted to be manually engaged while lifting and positioning the wheel supported truck.

5. In a power plant for operating sewer cleaning tools and the like, a truck frame, steering wheels supporting the front of said frame, an axle journalled in the rear portion of said frame, traction wheels carried by the ends of said axle, a motor mounted on the front portion of the truck frame, a transmission and a driving shaft, a shaft journalled on the truck frame in front of the rear axle, a worm wheel on said shaft, a worm engaging said worm wheel, a shaft upon which said worm is mounted, a sprocket wheel carried by said last mentioned shaft, a shaft connected to the transmission driven shaft, a sprocket wheel mounted on said last mentioned shaft, a sprocket chain connecting said sprocket wheel with the sprocket wheel that is mounted on the shaft that carries the worm, a plurality of sprocket wheels of different sizes mounted on the rear axle, pairs of sprocket wheels mounted on the shaft that is positioned in front of said rear axle, sprocket chains connecting the sprocket wheels on said shaft with the sprocket wheels on the rear axle, manually operable clutches mounted on said shaft between the members of each pair of sprocket wheels thereon for selectively effecting driving engagement between said shaft and either one of the members of either pair of sprocket wheels that are mounted on said shaft, a flexible rod driving shaft journalled on the side of the truck frame and driving connections between the engine driven shaft and said rod driving shaft.

6. In a sewer cleaning tool power plant, a truck frame, steering wheels supporting the forward end of said frame, an axle journalled in the rear portion of said frame, traction wheels on the ends of said axle, an engine mounted on the forward portion of the truck frame, a transmission controlled shaft driven by said engine, a rod driving shaft mounted for rotation on the side of said truck frame, driving connections from the shaft that is driven by the transmission controlled shaft to said rod driving shaft, controllable means for driving the rear axle at varying speeds from the transmission controlled shaft, a box mounted on the rear portion of the truck frame, standards projecting upwardly from the rear corners of the box and a transverse rod adapted to function as a handle arranged between the upper portions of said standards.

7. In a sewer cleaning tool power plant, the combination with a truck frame and steering wheels supporting the forward end thereof, of an axle journalled in the rear portion of the frame, traction wheels on the ends of said axle, a series of sprocket wheels of different sizes fixed on said axle, a shaft journalled on the truck frame in the front of said axle, sprocket wheels arranged in pairs on said shaft, sprocket chains connecting the sprocket wheels on said shaft with the sprocket wheels on said axle, an engine and a transmission mounted on the truck frame, driving connections from said transmission to said shaft and means for effecting driving engagement between said shaft and any one of the sprocket wheels mounted thereupon.

8. A sewer cleaning tool power plant as set forth in claim 7, with a rod driving shaft journalled on the side of the truck frame and driving connections between said transmission and rod driving shaft.

9. Apparatus for driving a flexible cleaning tool carrying rod including a wheeled power plant, a rod rotating means mounted for operation on on the plant outside the frame thereof and including a drive coupling adapted to receive a portion of the tool carrying rod lengthwise and in the direction in which the rod advances, a selective variable speed transmission connecting the coupling and the motor of the power plant, manually operable means for controlling the driving engagement between the variable speed transmission means and said rod rotating means and means for propelling the wheeled power plant in the axial direction of the rod at speeds commensurate with the advance of the tool carrying rod so as to avoid drag or push on the rod while the tool carried thereby is in action.

WILLIAM D. OSBORN.